US005774602A

United States Patent [19]
Taguchi et al.

[11] Patent Number: 5,774,602
[45] Date of Patent: Jun. 30, 1998

[54] WRITING DEVICE FOR STORING HANDWRITING

[75] Inventors: Toshio Taguchi; Kiyoshi Agusa, both of Kyoto; Shin-ichiro Yamamoto, Nagoya; Hiroki Nakamura, Kyoto, all of Japan

[73] Assignee: Yashima Electric Co., Ltd., Kyoto, Japan

[21] Appl. No.: 501,867

[22] Filed: Jul. 13, 1995

[30] Foreign Application Priority Data

Jul. 13, 1994 [JP] Japan .................................... 6-161291
Aug. 12, 1994 [JP] Japan .................................... 6-190220
Aug. 22, 1994 [JP] Japan .................................... 6-196797

[51] Int. Cl.$^6$ ............................................ G06K 9/22
[52] U.S. Cl. ............................................ 382/314; 382/188
[58] Field of Search .................................... 382/186, 187, 382/188, 189, 314; 358/473, 478, 476

[56] References Cited

U.S. PATENT DOCUMENTS

| 5,294,792 | 3/1994 | Lewis | 250/221 |
| 5,397,865 | 3/1995 | Park | 178/18 |
| 5,432,720 | 7/1995 | Lucente | 364/708.1 |

*Primary Examiner*—Leo Boudreau
*Assistant Examiner*—Phuoc Tran
*Attorney, Agent, or Firm*—Beveridge, DeGrandi, Weilacher & Young, L.L.P.

[57] ABSTRACT

A writing device for storing handwriting picks up a handwriting which is written on a paper using a lead, using a CCD area sensor by a predetermined sampling frequency, then stores the picked up image data by the storing device under the control of a microcomputer, so that data storing which data are effective for reproducing the handwriting using a comparatively simple program, is achieved.

23 Claims, 18 Drawing Sheets

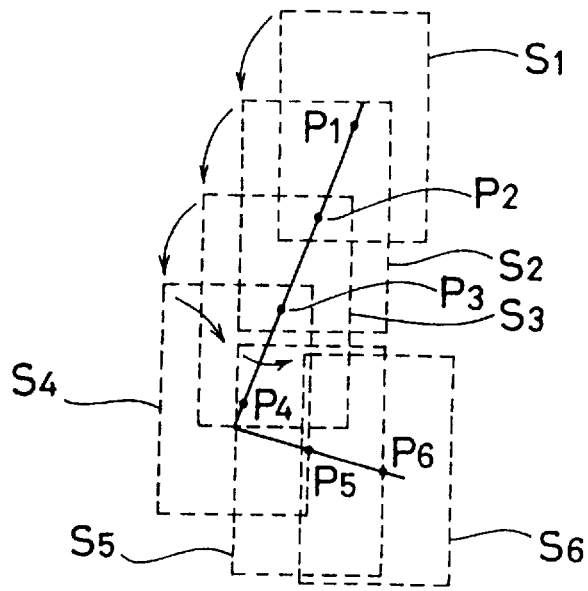
FIG. 3
FIG. 4
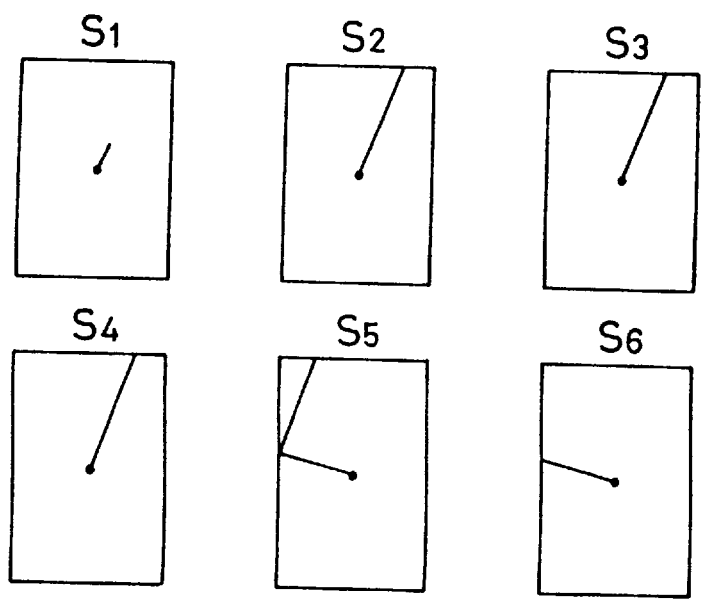

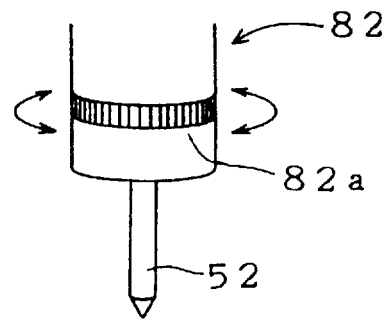
FIG. 13
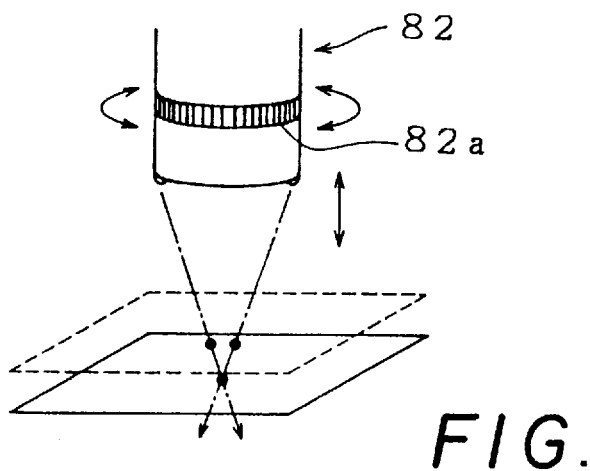
FIG. 14
FIG. 15
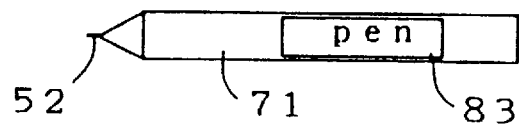

5,774,602

WRITING DEVICE FOR STORING HANDWRITING

TECHNICAL FIELD

The present invention relates to a writing device for storing handwriting which device records characters and the like (hereinafter, referred to as handwriting) on a paper or the like using a writing section and stores the handwriting therein.

RELATED ARTS

In recent years, a writing device for storing handwriting has been proposed (refer to U.S. Pat. No. 5,215,397) which writes characters, symbols and the like using a writing section, detects the handwriting using a stress sensor and an optical sensor, and stores the detected handwriting therein. The handwriting stored by the writing device is read out and displayed by a display device so that the handwriting is reused.

Detecting and storing of handwriting using a stress sensor and an optical sensor such as the writing device, are performed by storing output signals from both sensors. When the handwriting is to be reproduced, a computer program for reproducing handwriting becomes complicated because those signals are combined and processed.

The present invention is made in view of the above problem.

It is an object of the present invention to supply a writing device for storing handwriting which is effective for reproducing handwriting using a comparatively simple computer program with respect to the conventional computer program.

SUMMARY OF THE INVENTION

A writing device for storing handwriting of a first embodiment according to the present invention comprises, a writing section for writing characters, symbols and the like on a writing medium, an image pickup means for picking up an image of a predetermined extent of the writing medium which extent includes a leading edge of the writing section and handwriting written by the writing section, an image data taking means for taking image data picked up by the image pickup means at every predetermined sampling time, a storing means for sequentially storing the image data picked up at every predetermined sampling time, an image data outputting means for sequentially reading out the image data stored by the storing means and for outputting the read out image data, when it is required, a power supply section for driving those means, and a case body means for housing the image pickup means, the image data taking means, the storing means and the power supply section therein.

When this writing device for storing handwriting is employed, and when some characters, symbols or the like are written on the writing medium by the writing section, the predetermined extent of the writing medium which extent includes a leading edge of the writing section and handwriting written by the writing section, is picked up by the image pickup means. The picked up image data is taken at every predetermined sampling interval, and the image data which is sequential in time, is stored by the storing means. The image data stored by the storing means is output through the image data outputting means when it is required.

A writing device for storing handwriting of a second embodiment according to the present invention comprises, a writing section for writing characters, symbols and the like on a writing medium, an image pickup means for picking up an image of a predetermined extent of the writing medium which extent includes a leading edge of the writing section and handwriting written by the writing section, an image data taking means for taking image data picked up by the image pickup means at every predetermined sampling time, a storing means for sequentially storing the image data picked up at every predetermined sampling time, an image data transmitting means for sequentially transmitting the image data stored by the storing means to an external receiving apparatus, when it is required, a power supply section for driving those means, and a case body means for housing the image pickup means, the image data taking means, the storing means, the image data transmitting means and power supply section therein.

When this writing device for storing handwriting is employed, and when some characters, symbols or the like are written on the writing medium by the writing section, the predetermined extent of the writing medium which extent includes a leading edge of the writing section and handwriting written by the writing section, is picked up by the image pickup means. The picked up image data is taken at every predetermined sampling interval, and the image data which is sequential in time, is stored by the storing means. The image data stored by the storing means is transmitted through the image data transmitting means to the external receiving apparatus when it is required.

A writing device for storing handwriting of a third embodiment according to the present invention comprises, a writing section for writing characters, symbols and the like on a writing medium, an image pickup means for picking up an image of a predetermined extent of the writing medium which extent includes a leading edge of the writing section and handwriting written by the writing section, an image data taking means for taking image data picked up by the image pickup means at every predetermined sampling time, an image data transmitting means for sequentially transmitting the picked up image data to an external receiving apparatus, when it is required, a power supply section for driving those means, and a case body means for housing the image pickup means, the image data taking means, the image data transmitting means and the power supply section therein.

When this writing device for storing handwriting is employed, and when some characters, symbols or the like are written on the writing medium by the writing section, the predetermined extent of the writing medium which extent includes a leading edge of the writing section and handwriting written by the writing section, is picked up by the image pickup means. The picked up image data is taken at every predetermined sampling interval, and the taken image data is transmitted through the image data transmitting means to the external receiving apparatus when it is required.

A writing device for storing handwriting of a fourth embodiment according to the present invention comprises, a writing section for writing characters, symbols and the like on a writing medium, an image pickup means for picking up an image of a predetermined extent of the writing medium which extent includes a leading edge of the writing section and handwriting written by the writing section, an image data taking means for taking image data picked up by the image pickup means at every predetermined sampling time, a storing means for sequentially storing the image data picked up at every predetermined sampling time, an image outputting means for sequentially reading out the image data stored by the storing means and for outputting the read out image data, when it is required, a handwriting reproducing means for reproducing handwriting based upon the sequentially output image data, a transmitting means for sequentially transmitting the reproduced handwriting to an external receiving apparatus, when it is required, a power supply section for driving those means, and a case body means for housing the image pickup means, the image data taking means, the storing means, the image data outputting means, the handwriting reproducing means, the transmitting means and the power supply section therein.

When this writing device for storing handwriting is employed, and when some characters, symbols or the like are written on the writing medium by the writing section, the predetermined extent of the writing medium which extent includes a leading edge of the writing section and handwriting written by the writing section, is picked up by the image pickup means. The picked up image data is taken at every predetermined sampling interval, and the taken image data which is sequential in time, is stored by the storing means. The image data stored by the storing means is output through the image data outputting means when it is required, and is reproduced by the handwriting reproducing means so that an original handwriting is obtained. The obtained handwriting is transmitted by the transmitting means to the external receiving apparatus when it is required.

A writing device for storing handwriting of a fifth embodiment according to the present invention comprises, a writing section for writing characters, symbols and the like on a writing medium, an image pickup means for picking up an image of a predetermined extent of the writing medium which extent includes a leading edge of the writing section and handwriting written by the writing section, an image data taking means for taking image data picked up by the image pickup means at every predetermined sampling time, a first storing means for sequentially storing the image data picked up at every predetermined sampling time, an image outputting means for sequentially reading out the image data stored by the first storing means and for outputting the read out image data, when it is required, a handwriting reproducing means for reproducing handwriting based upon the sequentially output image data, a second storing means for storing the reproduced handwriting when it is required, a power supply section for driving those means, and a case body means for housing the image pickup means, the image data taking means, the first storing means, the image data outputting means, the handwriting reproducing means, the second storing means and the power supply section therein.

When this writing device for storing handwriting is employed, and when some characters, symbols or the like are written on the writing medium by the writing section, the predetermined extent of the writing medium which extent includes a leading edge of the writing section and handwriting written by the writing section, is picked up by the image pickup means. The picked up image data is taken at every predetermined sampling interval, and the taken image data which is sequential in time, is stored by the first storing means. The image data stored by the first storing means is output through the image data outputting means when it is required, and is reproduced by the handwriting reproducing means so that an original handwriting is obtained. The obtained handwriting is stored by the second storing means when it is required.

A writing device for storing handwriting of a sixth embodiment according to the present invention comprises, a writing section for writing characters, symbols and the like on a writing medium, an image pickup means for picking up an image of a predetermined extent of the writing medium which extent includes a leading edge of the writing section and handwriting written by the writing section, an image data taking means for taking image data picked up by the image pickup means at every predetermined sampling time, a handwriting reproducing means for reproducing handwriting based upon the sequentially taken image data, a transmitting means for transmitting the reproduced handwriting to an external receiving apparatus when it is required, a power supply section for driving those means, and a case body means for housing the image pickup means, the image data taking means, the handwriting reproducing means, the transmitting means and the power supply section therein.

When this writing device for storing handwriting is employed, and when some characters, symbols or the like are written on the writing medium by the writing section, the predetermined extent of the writing medium which extent includes a leading edge of the writing section and handwriting written by the writing section, is picked up by the image pickup means. The picked up image data is taken at every predetermined sampling interval, and the taken image data is reproduced by the handwriting reproducing means so that an original handwriting is obtained. The obtained handwriting is transmitted by the transmitting means to the external receiving apparatus when it is required.

A writing device for storing handwriting of a seventh embodiment according to the present invention comprises, a writing section for writing characters, symbols and the like on a writing medium, an image pickup means for picking up an image of a predetermined extent of the writing medium which extent includes a leading edge of the writing section and handwriting written by the writing section, an image data taking means for taking image data picked up by the image pickup means at every predetermined sampling time, a handwriting reproducing means for reproducing handwriting based upon the sequentially taken image data, a storing means for storing the reproduced handwriting when it is required, a power supply section for driving those means, and a case body means for housing the image pickup means, the image data taking means, the handwriting reproducing means, the storing means and the power supply section therein.

When this writing device for storing handwriting is employed, and when some characters, symbols or the like are written on the writing medium by the writing section, the predetermined extent of the writing medium which extent includes a leading edge of the writing section and handwriting written by the writing section, is picked up by the image pickup means. The picked up image data is taken at every predetermined sampling interval, and the taken image data is reproduced by the handwriting reproducing means so that an original handwriting is obtained. The obtained handwriting is stored by the storing means.

A writing device for storing handwriting of an eighth embodiment according to the present invention comprises, a case body means, a writing section which is housed within the case body means, an image pickup means including an electric image pickup element, a lens system and a light receiving opening section for the lens system which light receiving opening section is provided at a predetermined adequate position of the case body means, an image data taking means for taking the picked up image data, a storing means for storing the taken image data, a power supply section for driving the image pickup means, the image data taking means and the storing means, and an operation means for instructing pickup operation of the image pickup means.

When this writing device for storing handwriting is employed, characters, figures or the like are written on paper using the writing section. When a writing operation on one sheet of paper has been finished, the light receiving opening section of the image pickup means is directed towards the paper and the operation means is activated so as to operate the image pickup means. The image pickup means then picks up the image which corresponds to the entire paper, as one frame. The picked up image is stored by the storing means.

It is preferable that the storing means and/or power supply section are housed within the case body means in a removable manner.

It is preferable that the light receiving opening section is provided at an edge portion of the case body means which edge portion is opposite to the leading edge of the writing section, and that the light receiving opening section is provided at an edge portion of the case body means which edge portion is in the same side of the leading edge of the writing section, alternative to each other.

It is preferable that the writing device for storing handwriting further includes a marker-pointer for adjusting an expected image pickup extent of the writing medium and an image pickupable extent of the image pickup means.

It is preferable that the power supply section includes a chargeable battery and/or solar battery.

It is preferable that the image pickup means includes an image pickup element and that the writing device for storing handwriting further includes a focusing means for focusing an image which is formed on the image pickup element.

It is preferable that the focusing means includes ray radiating means for radiating rays from two or more locations which are different from one another, to the writing medium, each ray being directed in a predetermined direction.

It is preferable that the focusing means includes a means for measuring a distance between a predetermined position of the case body means and a surface of the writing medium, and a means for automatically adjusting a focal length of the image pickup means in correspondence to the measured distance.

It is preferable that the focusing means includes a gauge means for gauging a distance between a predetermined position of the case body means and a surface of the writing medium to be a predetermined distance.

It is preferable that the writing device for storing handwriting further includes a handwriting displaying section for displaying the handwriting which is reproduced based upon the image data taken by the image data taking means.

It is preferable that the image pickup means includes a lens which is exchangeable and which may be a telephoto lens, a medium angle lens or a wide angle lens.

It is preferable that the writing section is a cartidge-type writing section and is exchangeable.

The case body means may be a case body means for housing the writing section, or it may be a case body means which is removably attached to the writing section.

It is preferable that the writing device for storing handwriting further includes a charging section, that the storing means and the power supply section are united in one body, that the image data outputting means and the charging section are united in one body, and that when the image data outputting means outputs image data stored by the storing means, the power supply section is charged by the charging section.

BRIEF DESCRIPTION OF THE DRAWINGS

FIG. 3 is a diagram useful in understanding a handwriting detecting and storing method by a charge coupled device of the writing device for storing handwriting of a first embodiment according to the present invention;

FIG. 4 is a diagram illustrating specific individual images which are stored at every sampling interval by the writing device for storing handwriting of a first embodiment according to the present invention;

FIG. 13 is a schematic perspective view illustrating a focusing section of an example of the present invention;

FIG. 14 is a schematic perspective view illustrating a focusing section of another example of the present invention;

FIG. 15 is a schematic side view illustrating a handwriting displaying section;

PREFERRED EMBODIMENTS OF THE INVENTION

Figure 1:
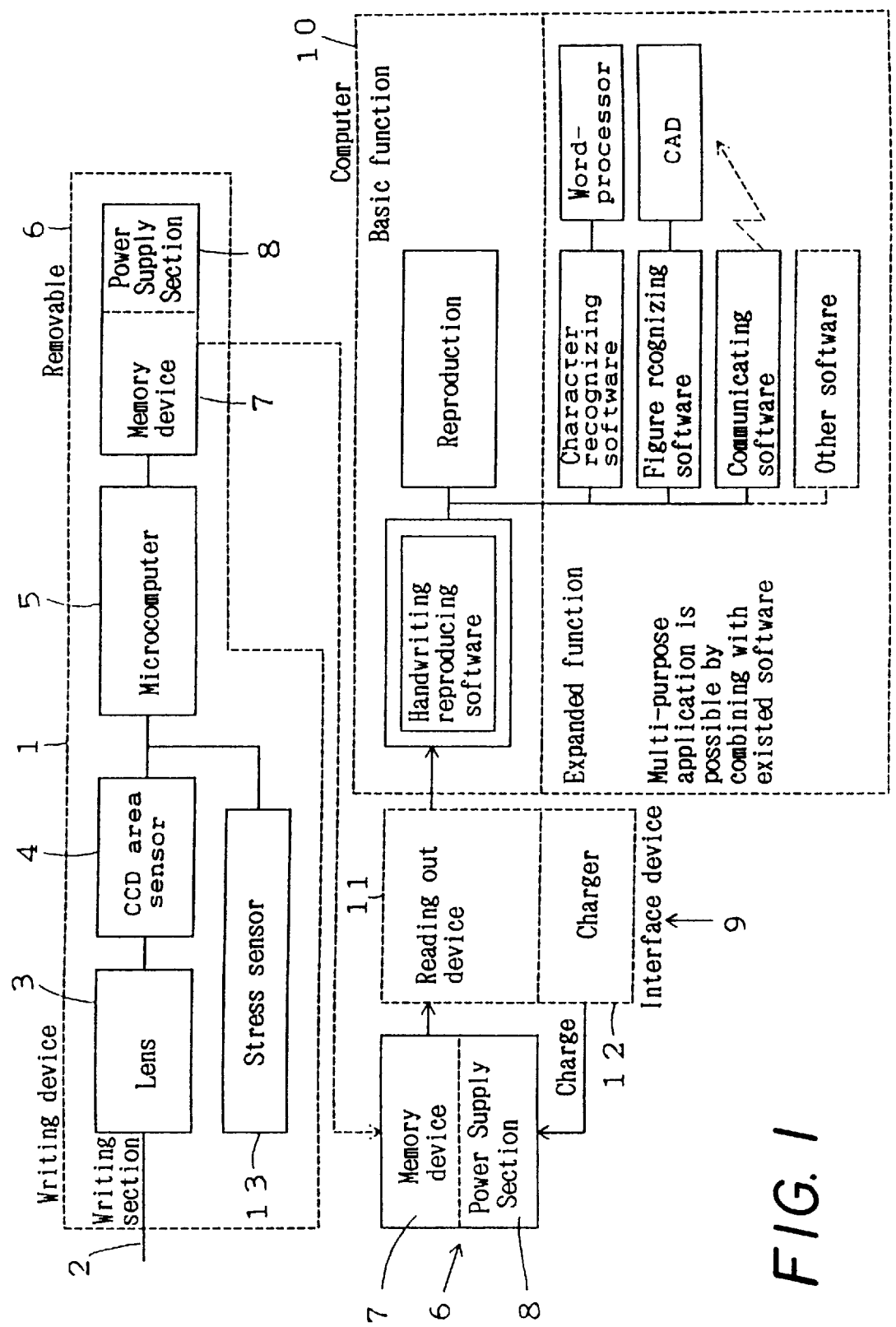
FIG. 1 is a block diagram illustrating an arrangement of a handwriting storing and reproducing apparatus which includes a writing device for storing handwriting of a first embodiment according to the present invention.

FIG. 1 is a block diagram illustrating a schematic arrangement of a handwriting storing and reproducing apparatus which includes a writing device for storing handwriting of a first embodiment according to the present invention. The handwriting storing and reproducing apparatus comprises a writing device 1 for detecting and storing handwriting, an interface device 9, and a computer 10 which reads out handwriting data from the writing device 1 through the interface device 9 and reproduces the handwriting.

The writing device 1 for storing handwriting includes a lead (writing section) 2 for writing something on a paper or the like, such as the lead of a ball point pen or the like, a lens 3, a CCD (charge coupled device) 4, a microcomputer 5, a storing device 7, a power supply (battery) 8, and a stress sensor 13 for detecting contact or non-contact of the lead 2 with the paper or the like. A unit 6 comprising the storing device 7 and the power supply 8 is provided to a main body of the writing device 1 in a removable manner.

When the unit 6 is removed from the main body of the writing device 1 and is connected to the interface device 9, handwriting data stored in the storing device 7 is taken into the computer 10 through a reading out device 11, which is a part of the interface device 9. At the same time, a battery of the power supply 8 is charged by a charger 12, which is also a part of the interface device 9.

The computer 10 includes software (program) for reproducing handwriting based upon taken handwriting data, and thus performs a handwriting reproducing function which is a basic function. The computer 10 also includes character recognizing software, figure recognizing software, communicating software and thus performs a character recognizing function, figure recognizing function, a communicating function and the like.

Figure 2:
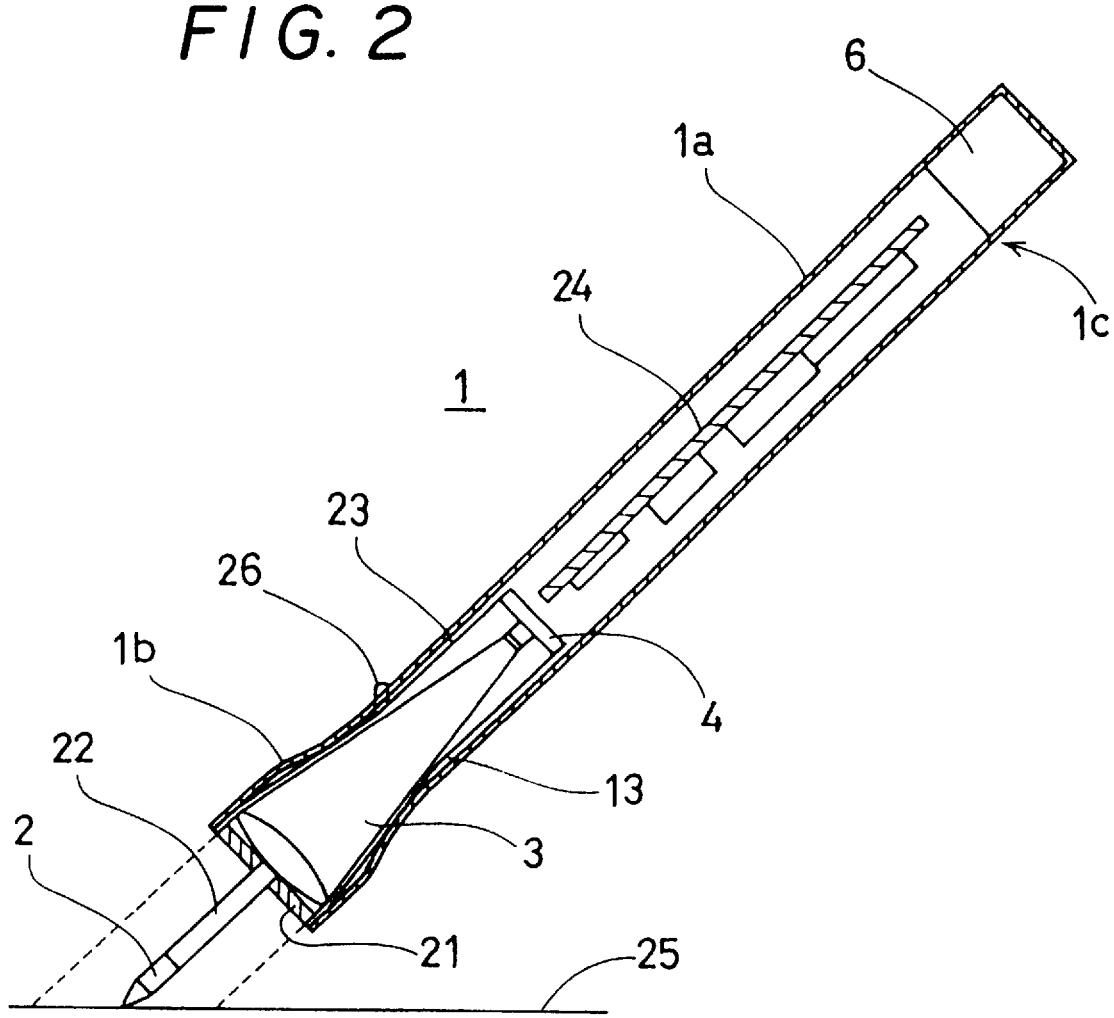
FIG. 2 is a cross-sectional view of the writing device for storing handwriting of a first embodiment according to the present invention.

FIG. 2 is a cross-sectional view of a writing device for storing handwriting data of a first embodiment according to the present invention. The writing device 1 for storing handwriting data has a pencil-shaped form and has a column-shaped case body 1a. The leading edge portion 1b of the case body 1a is enlarged in diameter to some degree. A transparent lead holding plate 21 is provided at the leading edge portion 1b of the case body 1a. A lead holder 22 for holding the lead 2 projects from the center of the lead holding plate 21. The lead holding plate 21, the lead 2 and the lead holder 22 constitute the writing section.

A telecentric lens 3 as a telecentric system is disposed at an inner position of the writing device 1 with respect to the lead holding plate 21. A CCD area sensor (image pickup means) 4 is disposed at a neighboring position of the inner edge portion of the telecentric lens 3. Although the telecentric lens 3 is drawn in FIG. 2 with the shape illustrated in the figure, this shape does not express the shape of the lens but instead schematically expresses the light path. In this embodiment, the optical axis of the telecentric lens 3 is coincident with the central axes of the lead 2 and lead holder 21 (and a central axis of the case body 1a). The CCD area sensor 4 is disposed on the optical axis. However, the optical axis of the telecentric lens 3 and the central axis of the writing section need not necessarily be coincident with one another. The optical axis of the telecentric lens 3 and the central axis of the writing section may be shifted in some degree relative to one another when the leading edge of the lead 2 (that is, a just-written point of a handwriting which is being written) is located within the field of view for optical detection by the CCD area sensor 4 and the just-written point is detected.

As is understood from FIG. 2, the lead holding plate 21, the lead 2, the lead holder 22, the telecentric lens 3 and the CCD area sensor 4 are fixed in one body in an inner case 23. The inner case 23 is slightly slidable along a direction parallel to the optical axis and toward the inner side of the case body 1a by writing pressure. When the inner case 23 slides, the stress sensor 13 is pressed by the inner case 23 and it detects that writing is being carried out. The stress sensor 13 can also be constructed to detect that writing is being carried out based upon bending of the inner case 23 in a vertical direction (radial direction) with respect to the optical axis.

A printed curcuit board 24 on which electrical circuitry including LSI (large scale integration) circuitry and the like is disposed is also located within the case body 1a. The CCD area sensor 4 is connected to the electrical circuitry, and detected handwriting signals are taken by the electrical circuitry. A unit 6 which houses the storing device 7 for storing the detected handwriting data and a battery is provided in the rear portion 1c of the case body 1a.

As noted before, a sensor (stress sensor) 13 for detecting a condition that writing is being carried out is provided between the inner case 23 and the inner wall of the case body 1a. The stress sensor 13 is pressed by the inner case 23 so that the condition that writing is being carried out is detected by the pressing force, when the inner case 23 is slightly moved to the inner side of the case body 1a by the writing force (writing pressure), as was described earlier. A start switch 26 is provided at a portion of the case body 1a which is located outward of the stress sensor 13. The power supply for the writing device 1 is controlled in an ON/OFF manner by operating the start switch 26.

When the writing device 1 is used, the start switch 26 is pressed so as to turn on the power supply. The writing device user then grasps and inclines the case body 1a with respect to the paper 25 (as is illustrated in FIG. 2) and writes characters, figures or the like. The inclined condition is the ordinary writing condition. The inner case 23 slightly moves into the case body 1a because of the writing force, and the stress sensor 13 detects a condition that writing is being carried out. And, the handwriting, that is the image on the paper 25, is received by the telecentric lens 3 as rays which are parallel to the optical axis. The image is then transformed into handwriting signals by the CCD area sensor 4. The handwriting signal undergoes data compression such as thinning and the like by the electrical circuitry, and is sequentially stored by the storing device 7. Further, the leading edge of the lead 2 may move apart from the paper 25 and may move three dimensionally during its writing operation, and the detection signal from the sensor 13, indicating whether the leading edge of the lead 2 is moving three dimensionally or is writing on the paper 25, is stored by the storing device 7 simultaneously with the handwriting signal. The detection signal indicating whether the leading edge of the lead 2 is moving three dimensionally or is writing on the paper 25 is used to more easily reproduce the handwriting when the handwriting is being reproduced by the handwriting reproducing software (handwriting reproducing means) in the computer 10 (which is illustrated in FIG. 1).

Next, the handwriting storing operation of the writing device 1 will be described.

It is assumed for this explanation that the character "L" is written on the paper 25 using the lead 2 of the writing device 1. During the writing, the CCD area sensor 4 sequentially takes images within the field of view at a constant sampling frequency. It is also assumed, as shown in FIG. 3, that a first line having a gentle inclination is written from an upper portion to a leftward lower portion, and then a second line having a gentle inclination is written from the leftward lower portion to a rightward lower portion. It is further assumed that the portion of the lead 2 is moved from P1, P2, . . ., P6, . . . at each corresponding sampling time.

The field of view of the CCD area sensor 4 moves from S1, S2, . . . , S6, . . . . The storing device 7 stores small images defined by S1, S2, . . . , S6, . . . as image data, so the small images will hereinafter be referred to by S1, S2, . . . , S6, . . . . The small images S1, S2, . . . , S6, . . . are illustrated in FIG. 4 and have the same size as of the field of view of the CCD area sensor 4.

The entire handwriting is stored by storing the small images of constant size continuously during the writing.

Next, the handwriting reproducing operation for reproducing handwriting based upon the sequentially stored image data stored within the writing device 1 will be described.

Though the small images S1, S2, . . ., S6, . . . illustrated in FIG. 4 are partial handwritings, those small images may be read out from the storing device 7 of the writing device 1 and the read out small images may be displayed by a display section of the computer 1.

But, a user hardly recognizes which characters are included in the handwriting even when the small images illustrated in FIG. 4 are read out and are displayed as they are shown in FIG. 4. A user needs all characters, that is the entire image, written by the writing device 1. Therefore, the handwriting reproducing apparatus reproduces the entire image including the written characters, figures and the like by effectively using the images S1, S2, . . ., S6, . . . stored by the storing device 7.

In handwriting reproduction of the handwriting reproducing apparatus, the concepts of "cell", "act", "scene" and "page" are employed and a hierarchical arrangement is constructed so that reproduction with high accuracy is performed. Hereinafter, the simplest reproducing operation using cells is described.

Figure 5:
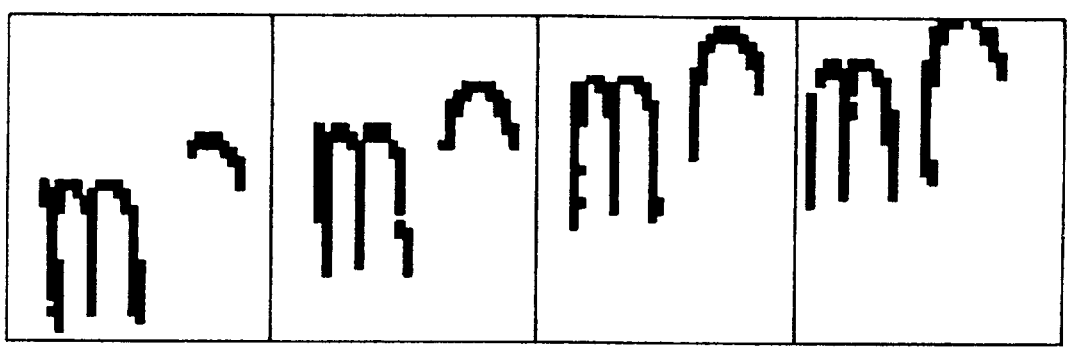
FIG. 5 is a diagram illustrating a specific example of partial images (cells) which are used for reproducing handwriting.

The "cell" is a small image having a fixed number of picture elements, and is the smallest image which is the basis of the handwriting reproducing. S1, S2, . . ., S6, . . . illustrated in FIG. 4 correspond to cells. Another specific example of cells is illustrated in FIG. 5.

The "act" is an image which is constructed by overlapping a series of cells which are sequential in time with respect to one another. The series of cells is used to express a string of cells which is determined as long as possible when a positional relationship between the sequential or continuous cells is obtained, that is a positional relationship of a cell with a just-prior cell is obtained.

The "scene" is an image which is constructed of plural acts, each of which is obtained based upon its positional relationship to another act. When a positional relationship between one series of cells and another series of cells is not obtained, these two series of cells become a part of acts respectively which are different from one another. These series of cells represents a completion in their meaning, respectively, as is described earlier. But, if a positional relationship can be obtained between two acts, such acts are put together as a scene.

A "page" is an image which is constructed of a series of scenes and represents a completion of a writing operation. A scene which constitutes one page includes no portion which is to be overlapped with another scene. Further, partitioning between pages is clearly given by a user.

Reproduction of handwriting based upon two cells is as follows.

A coincident partial image is extracted from the cell (for example, the cell S1) which was read out at first, and the cell which was read out following the cell which was read out at first. The first cell and a cell which includes the coincident partial image (for example, S1 and S2) are overlapped at a position at which both cells are coincident to one another, so that a composite image is obtained. Next, the composite image and a following cell image thereof are sequentially compared to one another. When a coincident partial image exists in both images, the cell image is overlapped to the composite image so that a new composite image is obtained. The composite image is enlarged as an act when the composite image and the read out following cell image have a coincident partial image. When the composite image, that is the act, and the cell image have no coincident image, the composite image is determined to be an act. And, the cell image is judged to determine whether or not the cell image and a following cell image which is read out later, have a coincident partial image. Both cell images are overlapped to one another so that another act is constructed when both cell images have a coincident partial image.

Figure 6:
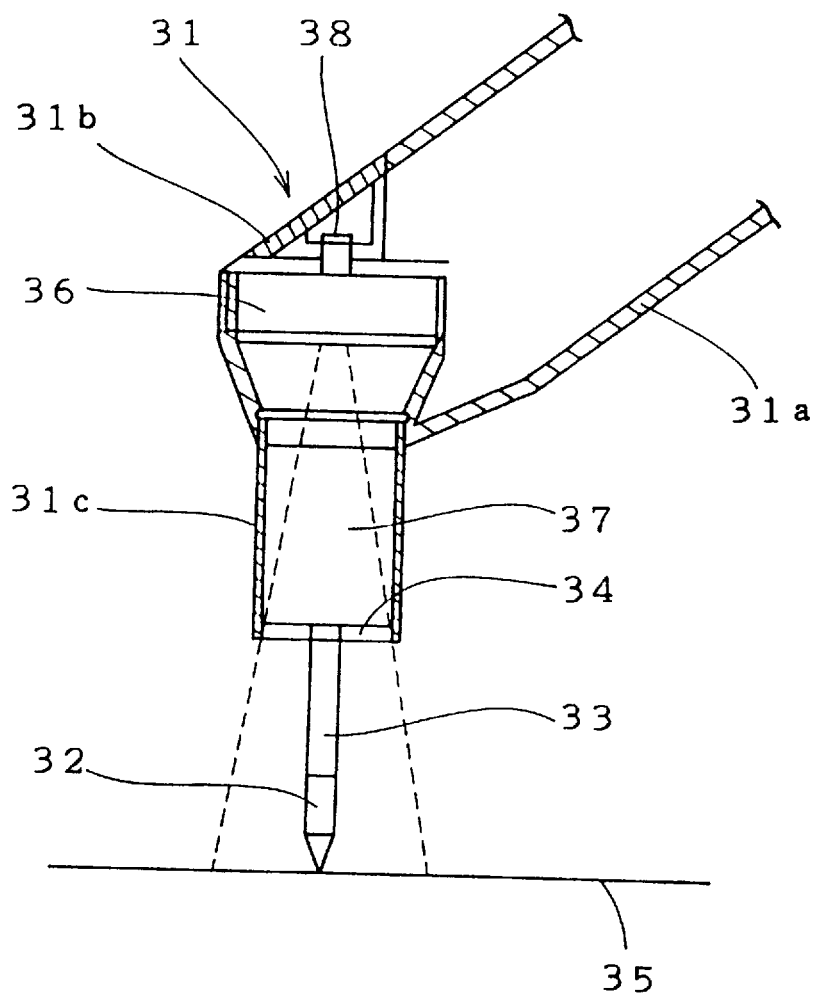
FIG. 6 is a cross-sectional view of a writing device for storing handwriting of another arrangement according to the present invention.

FIG. 6 is a cross-sectional view of a writing or storing handwriting of another arrangement according to the present invention.

In the writing device illustrated in FIG. 6, a case body 31 includes a grasping section 31a, an openable door section 31b and a leading edge section 31c. The grasping section 31a and the leading edge section 31c are bent relative to one another. The leading edge section 31c provides a lead holder 33 for holding a lead 32, and the lead holder 33 is held by a lead holding plate 34. Further, a CCD area sensor 36 is provided in a leading edge section of the grasping section 31a, and a lens system 37 is provided between the CCD area sensor 36 and the lead holding plate 34 in the leading edge section 31c. Furthermore, a microcomputer for controlling the detection of handwriting, a storing device for storing a detected handwriting as electrical information, and a battery, which are not illustrated, are provided within the grasping section 31a. Also, a stress sensor 38 is provided within the leading edge section of the grasping section 31a so as to detect a condition of the lead 32 to determine whether or not actual writing is being carried out.

The writing device makes the face of the CCD area sensor 36 and the face of the lens system 37 parallel to the face of the writing medium 35 for recordation, even when a writer grasps the writing device for storing handwriting as if grasping of an ordinary writing device. Therefore, a handwriting can be detected with little deformation and with relative accuracy.

Figure 7:
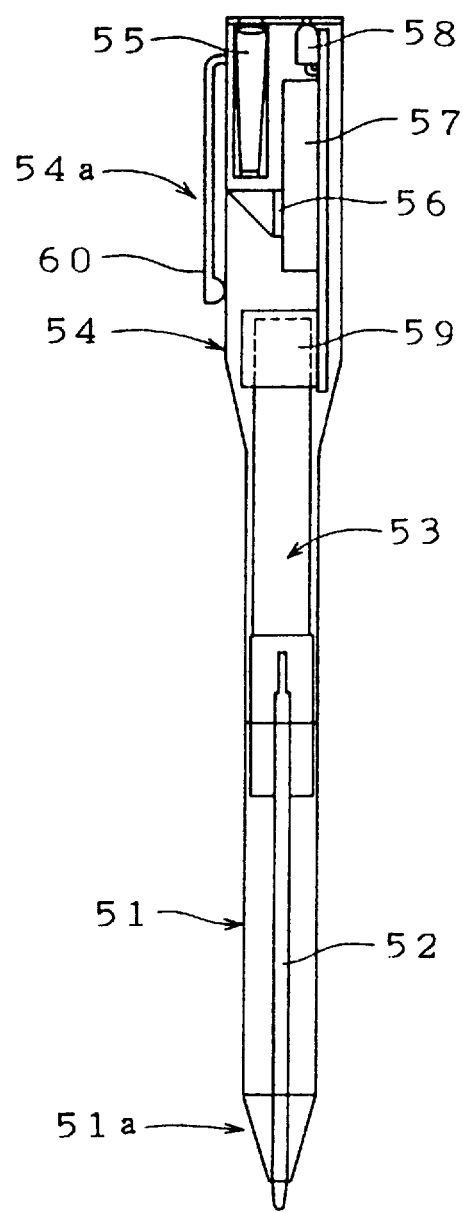
FIG. 7 is a cross-sectional view of a writing device for storing handwriting of a further arrangement according to the present invention.
Figure 8:
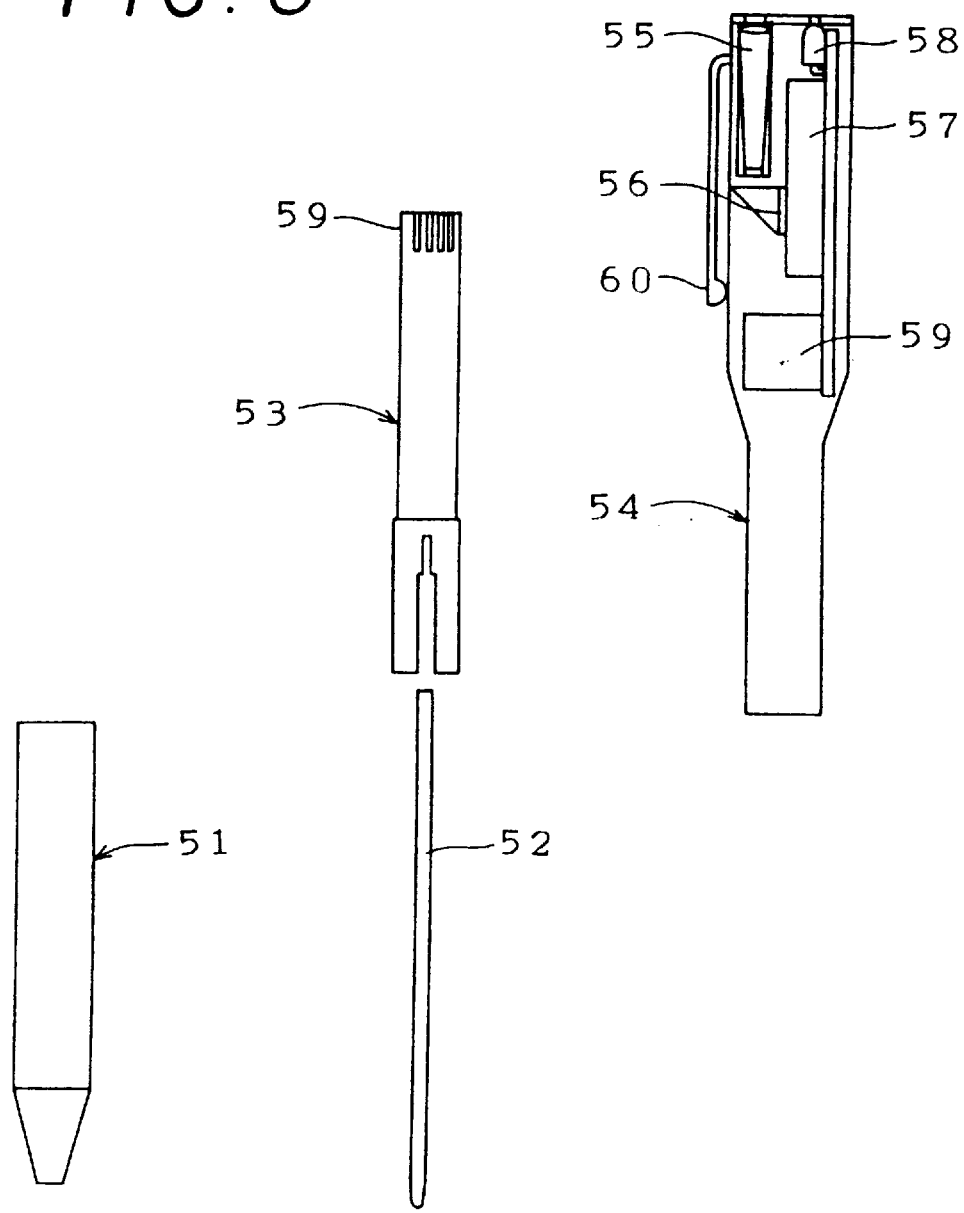
FIG. 8 is a schematic view illustrating component sections of the writing device ilustrated in FIG. 7 in a diassembled manner.

FIG. 7 is a cross-sectional view of a writing device including a camera (a writing device for storing handwriting) of a further arrangement according to the present invention, while FIG. 8 is a schematic view illustrating component sections of the writing device ilustrated in FIG. 7 in a diassembled manner.

The writing device includes a cylindrical grasping body 51 which is gradually reduced in diameter at the leading edge portion, a lead (writing section) 52, a memory unit 53 and a CCD camera (image pickup means) 54 with an extremely small size. The grasping body 51 and a case body of the CCD camera 54 constitute a case body of the writing device.

A lens system 55 for picking up an image, a CCD element 56 for receiving an image and electrical elements 57 of a microcomputer for transforming the picked up image data into digitalized electric data and for storing the transformed electric data within a digital image memory, are provided within an edge section 54a of the writing device which edge section 54a is opposite to the edge section 51a at which the lead 52 for writing is disposed. The lens system 55, CCD element 56 and the electrical elements 57 of the microcomputer constitute the CCD camera 54. The CCD camera 54 has an extremely small size and is well known to a person having ordinary skill in the art.

A light emitting device 58 as a pointer is provided as a marker. This marker facilitates positioning between a portion of the paper which is to be picked up as an image, and the CCD camera 54.

The memory unit 53 includes therein a battery for driving the circuitry section of the CCD camera 54 and a memory 61 for storing image data. The memory unit 53 is arranged so that the memory unit 53 is removable from the case body of the writing device. When writing is ordinarily performed and an image is picked up, the memory unit 53 is connected to the electrical elements 57 of the microcomputer and the like through connectors 59.

A switch 60 for instructing pickup operation of the CCD camera 54 is provided in a projected manner at an outerward position with respect to the CCD camera 54 of the writing device.

Figure 9:
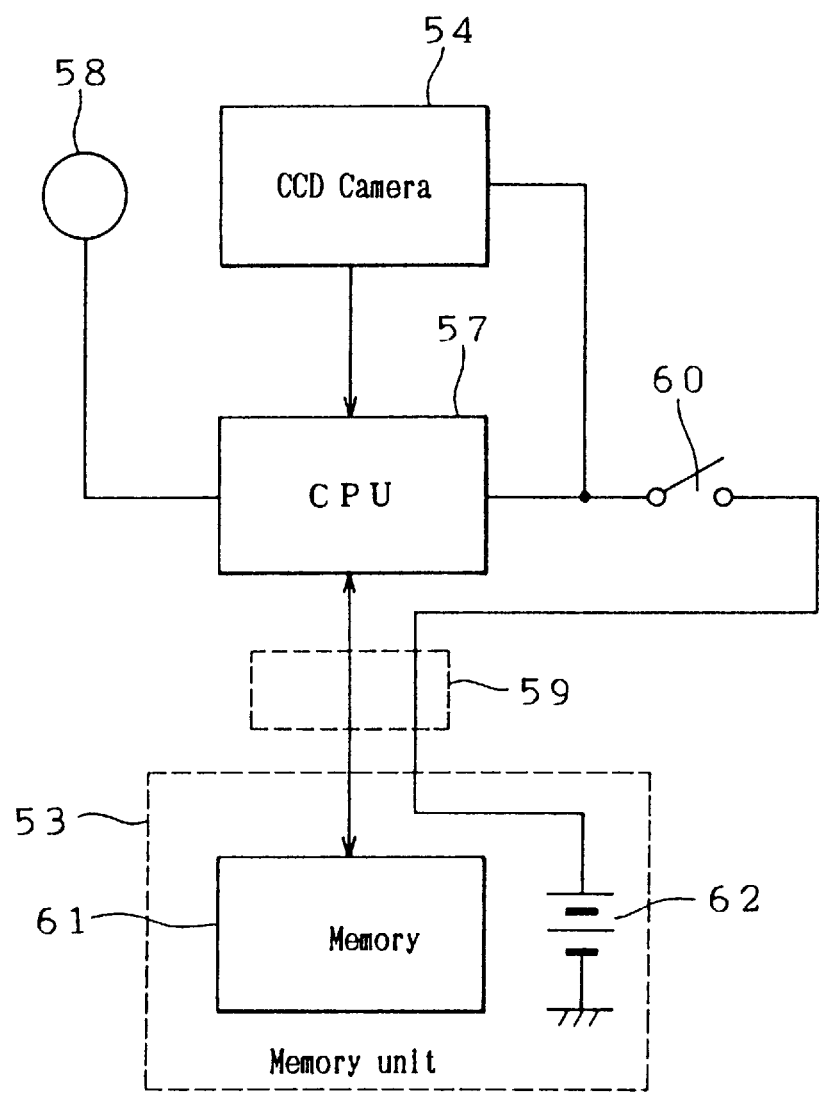
FIG. 9 is a block diagram illustrating an electric arrangement of the writing device ilustrated in FIG. 7.

FIG. 9 is a block diagram illustrating an electric arrangement of the writing device ilustrated in FIG. 7.

An image memory 61 and a secondary battery 62 are housed within the meory unit 53. The memory unit 53 is connected to a CPU (microcomputer) 57 and the switch 60 through the connectors 59. The CCD camera 54 and the light emitting element 58 for pointing are connected to the CPU 57. When the switch 60 is operated and the CCD camera 54 is operated, a picked up image is stored within the image memory 61 through the CPU 57. Also, the light emitting element 58 for pointing emits a light when the switch 60 is operated.

When characters, figures or the like are written on the paper using the lead 52 of the writing device including the camera, and when the writing operation has been finished on one paper which is objected for writing, the writing device is regrasped by reversing its top and bottom and the switch 60 is operated so that the light emitting element 58 for pointing emits light. The positioning of the CCD camera 54 with respect to the paper is performed by moving the writing device to and fro with respect to the paper. The switch 60 is then operated so that the CCD camera 54 picks up an image of one frame. The image picked up by the CCD camera 54 is stored within the image memory 61 of the memory unit 53 through the electrical elements 57 of the microcomputer.

By repeating the above operation thereafter, plural image data, each of which is written on one paper, are picked up and stored until the total number of image data exceeds the limit of the storing capacity of the image memory 61.

When handwriting is to be reproduced, the memory unit 53 is taken out from the writing device. The memory unit 53 is then attached to a connecter which is provided within an interface device so that the stored image data is taken into a computer and the handwriting is reproduced by the computer.

The reproduced image data is used by displaying the image on a CRT (Cathode Ray Tube) display, printing out the image, transferring the image to a distanced place through a communicating modem, storing the image data within a storing device which is housed within a computer or the like.

Figure 10A:
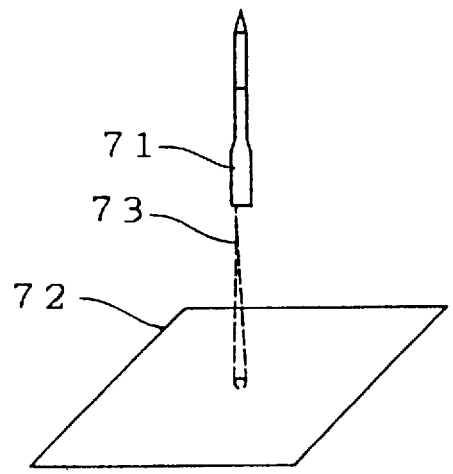
FIGS. 10(a) through 10(d) are diagrams useful in understanding operations of a marker-pointer.

Next, the operations of the light emitting element for pointing (the marker-pointer) are described referring to FIGS. 10(a) through 10(d). A light beam (pointer beam) 73 is radiated at the center of the written paper 72 as is illustrated in FIG. 10(a). In this case, the size of the paper 72 is limited to some degree (for example, less than A4 size) and the writing device 71 is apart from the paper 72 by about xx cm so as to pickup the image. By performing the operation described above, the marker-pointer functions as a pointer.

Figure 10B:
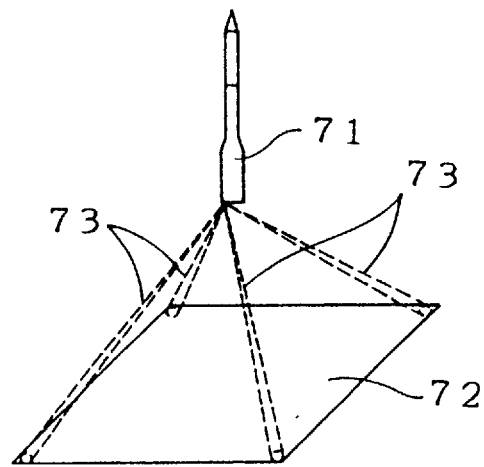
Figure 10C:
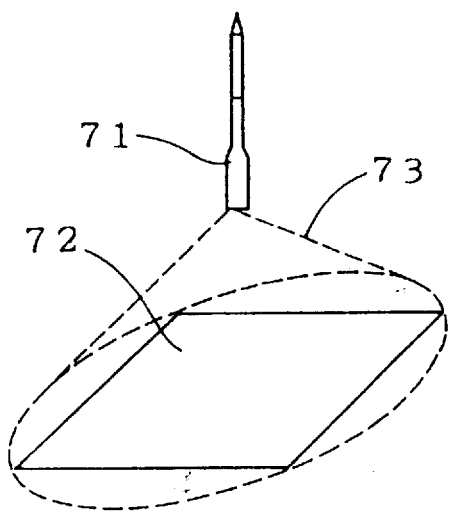
Figure 10D:
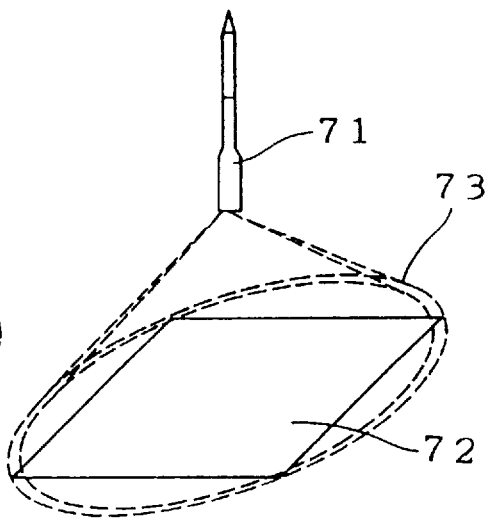

Plural pointer beams 73 may be generated so as to indicate a pickup extent, as is illustrated in FIG. 10(b). A conically enlarging light 73 may be employed instead of the pointer beam so as to illuminate the entire pickup extent, as is illustrated in FIG. 10(c). A ring shaped light 73 may be employed instead of the pointer beam so as to illuminate the pickup extent, as is illustrated in FIG. 10(d). In those cases, it is preferable that the lens system is determined so that its depth of field is as deep as possible so that no focusing is required depending upon the pickup extent.

Further, the secondary battery 62 housed within the memory unit 53 is charged by charging circuitry housed within an interface device during the time period for taking the image data into the computer. Therefore, the preparation for the next usage of the secondary battery 62 is performed.

The above embodiment has the arrangement that the grasping body 51 the memory unit 53, and the CCD camera 54 are removable from one another, but the present invention is not limited to this arrangement. The present invention may have an arrangement that the grasping body 51, the memory unit 53 and the CCD camera 54 are made in one body and that the lead, memory, battery or the like are removable.

In the above embodiment, the CCD camera (image pickup means) 54 is provided in the edge section of the writing device which edge is opposite to the leading edge of the lead 52, but the present invention is not limited to the embodiment. The present invention may have an arrangement such that the CCD camera 54 is provided in parallel to the lead 52. The present invention may also have an arrangement such that the lens system and the CCD element are disposed on the peripheral portion of the lead 52 and such that an opening of the lens system is provided on the same side of the leading edge of the lead 52.

Figure 11A:
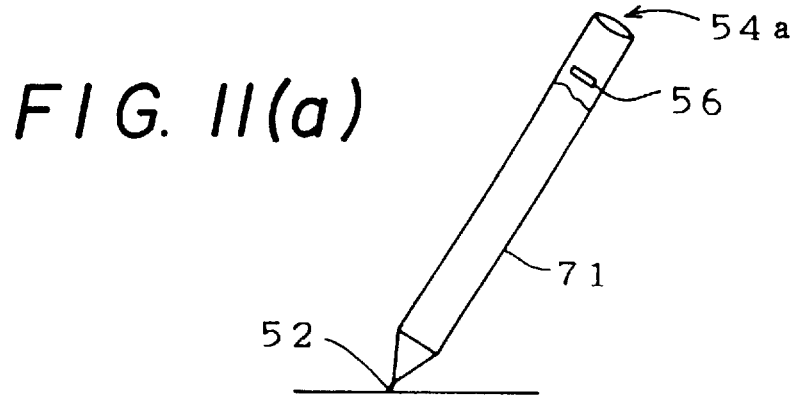
FIGS. 11(a) and 11(b) are schematic side views illustrating relations between an image pickup element and a light receiving opening section.
Figure 11B:
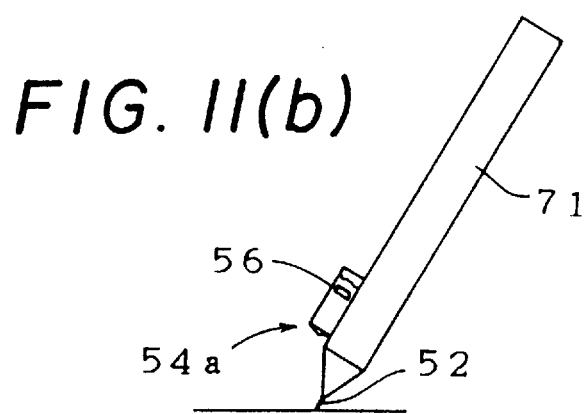

FIGS. 11(*a*) and 11(*b*) are schematic side views illustrating relations between an image pickup element and a light receiving opening section.

A CCD element 56 and a light receiving opening section 54*a* are provided at an edge portion of the case body of the writing device which edge is opposite to the leading edge of the lead 52, as is illustrated in FIG. 11(*a*). Handwriting on a paper is picked up by determining the direction of the case body, which direction is the reversed direction with respect to the direction of the case body when it is in a posture for writing. A CCD element 56 and a light receiving opening section 54*a* are provided at an edge portion of the case body of the writing device which edge is at the same side to the leading edge of the lead 52, as is illustrated in FIG. 11(*b*). Handwriting on a paper is picked up with scarcely a change in the posture of the case body for writing.

Figure 12:
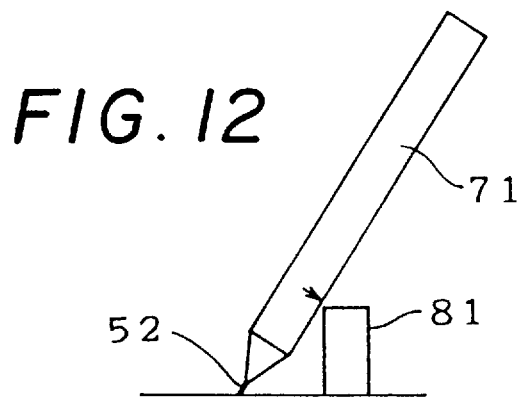
FIG. 12 is a schematic side view useful in understanding a gauge member.

FIG. 12 is a schematic side view useful in understanding a gauge member.

The gauge member 81 is a member for accurately determining a distance between a predetermined position of the case body and the paper. A size of a picked up region can be made to be a nearly constant size and a thickness of a picked up handwriting can be made to be a nearly constant thickness by determining this distance accurately.

FIG. 13 is a schematic perspective view illustrating a focusing section of an example of the present invention.

The focusing section 82 has a mechanism (not illustrated) which is similar to the mechanism of a zoom lens of a camera, and has a rotatable focusing ring 82*a* so as to operate the mechanism from outside of the case body. Therefore, the focal point of the lens system 55 (refer to FIGS. 7 and 8) can be adjusted to coincide with the paper by rotating the focusing ring 82*a*. As a result, handwriting on the paper is picked up clearly.

FIG. 14 is a schematic perspective view illustrating a focusing section of another example of the present invention.

The focusing section 82 has a mechanism which is similar to that of the focusing section illustrated in FIG. 13, and has an arrangement such that two (or more than three) light beams are radiated to the paper from peripheral positions of the leading edge portion of the case body, each light beam being radiated at a predetermined angle with respect to the paper. Therefore, it is understood that the focal point of the lens system 55 is coincident to the paper when those light beams cross one another on the paper (refer to a solid line illustrated in FIG. 14). On the contrary, it is understood that the focal point of the lens system 55 is not coincident to the paper when those light beams do not cross one another on the paper (refer to a dashed line illustrated in FIG. 14). As a result, a focusing operation result is easily recognized.

FIG. 15 is a schematic side view illustrating a handwriting displaying section.

A condition of the taken image data is easily recognized by displaying the taken image data on the handwriting displaying section. The handwriting displaying section may be a liquid crystal display.

Further, reproduced handwriting can be displayed instead of the taken image data when the case body includes a handwriting reproducing section therein.

Figure 16:
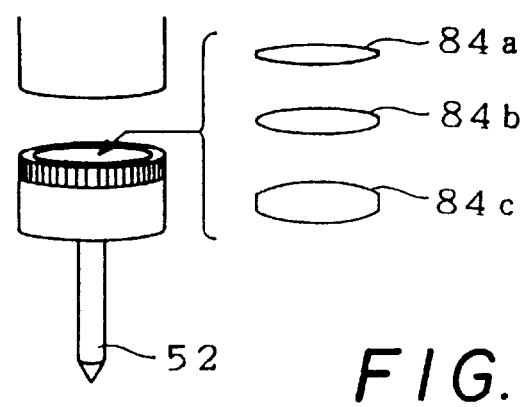
FIG. 16 is a schematic perspective view illustrating a lens exchanging section.

FIG. 16 is a schematic perspective view illustrating a lens exchanging section.

As shown in FIG. 16, a lens exchanging operation can be performed so as to mount a telephoto lens, a medium angle lens or a wide angle lens to the case body by removing a leading edge portion of the case body. The lens system is determined to have a desired angle of visibility by performing the lens exchanging operation.

Figure 17:
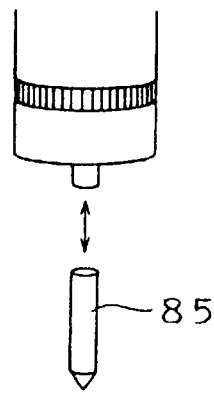
FIG. 17 is a schematic perspective view illustrating an exchanging condition of a writing section.

FIG. 17 is a schematic perspective view illustrating an exchanging condition of a writing section.

In FIG. 17, the writing section is a cartridge-type writing section and is exchangeable. Therefore, a writable condition is obtained by exchanging the writing section 85 with a new one when the writing section 85 becomes free from ink or the like so that writing using the writing section 85 becomes impossible.

Figure 18:
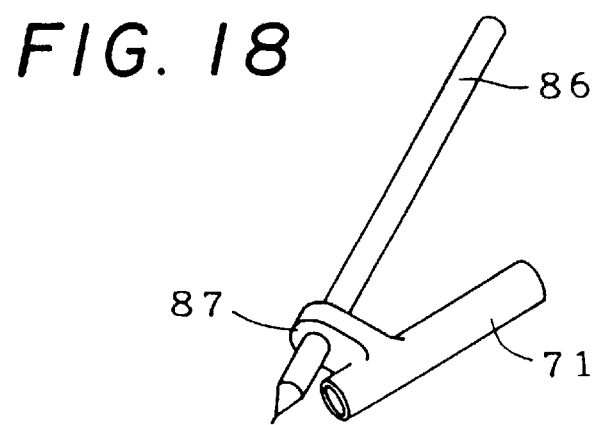
FIG. 18 is a schematic perspective view illustrating a case body and a writing section which case body is removably attached to the writing section.

FIG. 18 is a schematic perspective view illustrating a case body and a writing section where the case body is removably attached to the writing section. In FIG. 18, the writing section 86 is employed with a generally solid writing section, and a projection section 87 is provided at a predetermined position of the case body at which projection section 87 the writing section 86 is mounted in a passing through condition. Therefore, the case body can easily be mounted to a desired writing section 86.

Figure 19:
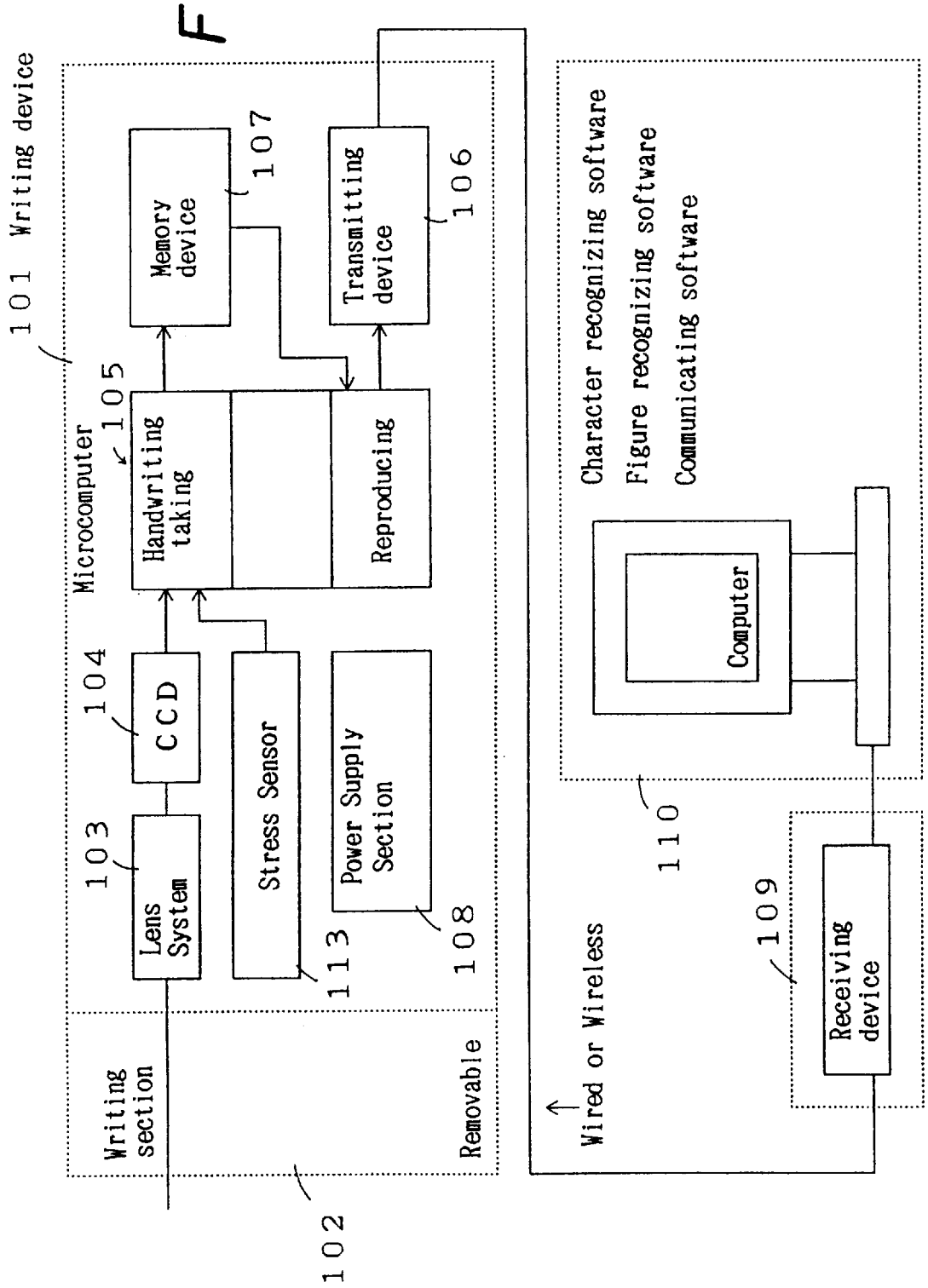
FIGS. 19 through 24 are block diagrams illustrating arrangements of handwriting storing and reproducing apparatuses which include a writing device for storing handwriting of second through seventh embodiments, respectively, according to the present invention.

FIG. 19 is a block diagram illustrating an arrangement of a handwriting storing and reproducing apparatus which includes a writing device for storing handwriting of a second embodiment according to the present inention.

The handwriting storing and reproducing apparatus comprises a writing device 101 for detecting and storing handwriting, a receiving device 109, and a computer 110 which receives handwriting data from the writing device 101 through the receiving device 109.

The writing device 101 for storing handwriting includes a lead (writing section) 102 for writing something on a paper or the like, such as the lead of a ball point pen or the like, a lens system 103, a CCD (charge coupled device) 104, a microcomputer 105, a storing device 107, a power supply (battery) 108, a stress sensor 113 for detecting contact or non-contact of the lead 102 with the paper or the like, and a transmitting device 106.

The computer 110 includes character recognizing software, figure recognizing software, and communicating software, so that it has a character recognizing function, a figure recognizing function, a communicating function and the like.

The microcomputer 105 includes software (program) for taking handwriting data therein from the CCD 104 and the stress sensor 113, that is, software with a handwriting data taking function, software for writing the taken handwriting data in the storing device 107, that is, software with a handwriting data writing fuction, and software for reproducing handwriting data representing an original handwriting based upon the stored handwriting data, that is, software with a handwriting reproducing function.

The transmitting device 106 receives the reproduced handwriting data and sends the reproduced handwriting data to the receiving device 109. The data transmission may be a wired data transmission or may be a wireless data transmission.

When this apparatus is employed, handwriting images taken by the microcomputer 105 through the lens system 103, CCD 104, and stress sensor 113 signals are taken as handwriting data. The taken handwriting data is stored by the storing device 107. The stored handwriting data is read out and reproduced by the microcomputer 105 so as to obtain reproduced handwriting data. The reproduced handwriting data is transmitted by the transmitting device 106 to the receiving device 109. The transmitted handwriting data is sent from the receiving device 109 to the computer 110.

Figure 20:
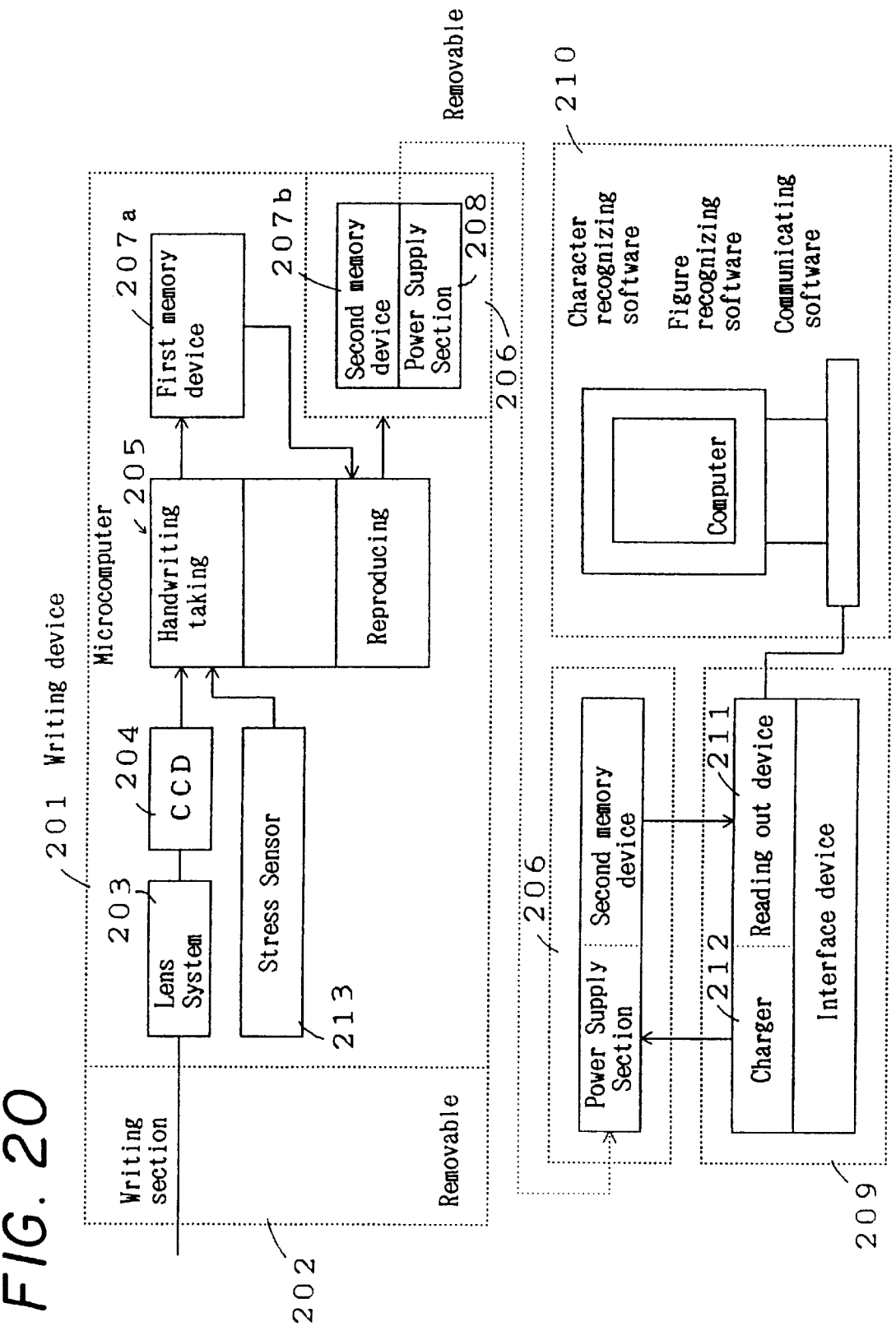

FIG. 20 is a block diagram illustrating an arrangement of a handwriting storing and reproducing apparatus which includes a writing device for storing handwriting of a third embodiment according to the present invention.

The handwriting storing and reproducing apparatus comprises a writing device 201 for detecting and storing handwriting, an interface device 209, and a computer 210 which reads out handwriting data from the writing device 201 through the interface device 209.

The writing device 201 for storing handwriting includes a lead (writing section) 202 for writing something on a paper or the like, such as the lead of a ball point pen or the like, a lens system 203, a CCD (charge coupled device) 204, a microcomputer 205, a first storing device 207a for storing taken handwriting data, a second storing device 207b for storing reproduced handwriting data, a power supply (battery) 208, a stress sensor 213 for detecting contact or non-contact of the lead 202 with the paper or the like. A unit 206 comprising the second storing device 207a and the power supply 208 is provided to a main body of the writing device 201 in a removable manner.

When the unit 206 is removed from the main body of the writing device 201 and is connected to the interface device 209, handwriting data stored in the second storing apparatus 207b is taken into the computer 210 through a reading out device 211, which is a part of the interface device 209. At the same time, a battery of the power supply 208 is charged by a charger 212, which is also a part of the interface device 209.

The computer 210 includes character recognizing software, figure recognizing software, and communicating software, so that it can perform a character recognizing function, a figure recognizing function, communicating function and the like.

The microcomputer 205 includes software (program) for taking handwriting data therein from the CCD 204 and the stress sensor 213, that is, software with a handwriting data taking function, software for writing the taken handwriting data in the first storing device 207a, that is, software with a handwriting data writing fuction, and software for reproducing handwriting data representing an original handwriting based upon the stored handwriting data, that is, software with a handwriting reproducing function.

When this apparatus is employed, handwriting images taken by the microcomputer 205 through the lens system 203, CCD 204, and stress sensor 213 signals are taken as handwriting data. The taken handwriting data is stored by the first storing device 207a. The stored handwriting data is read out and reproduced by the microcomputer 205 so as to obtain reproduced handwriting data. The reproduced handwriting data is stored in the second storing device 207b. When the unit 206 is removed from the writing device 201 and is connected to the interface device 209, the stored reproduced handwriting data is read out by the computer 210 through the interface device 209.

Figure 21:
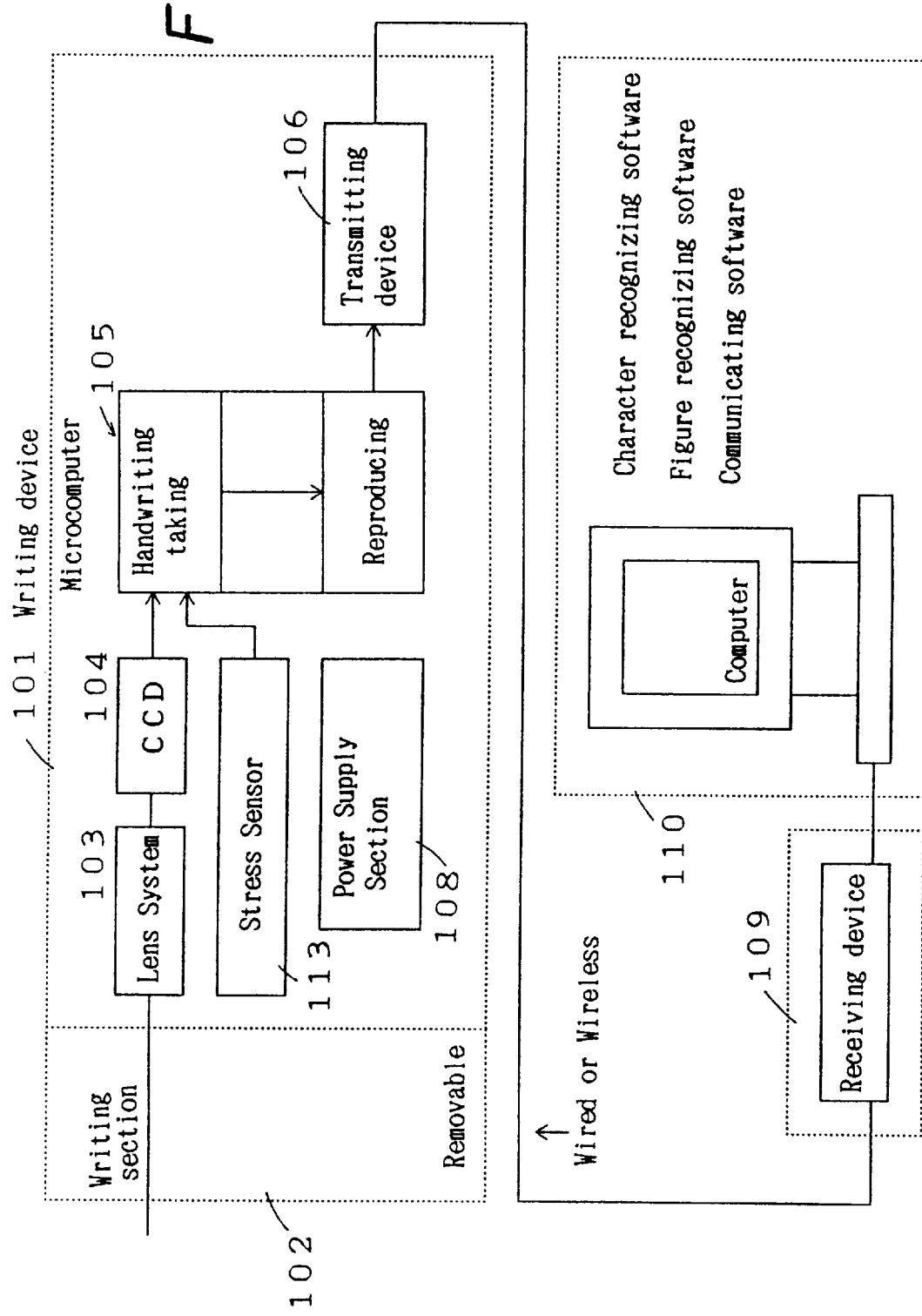

FIG. 21 is a block diagram illustrating an arrangement of a handwriting storing and reproducing apparatus which includes a writing device for storing handwriting of a fourth embodiment according to the present invention.

The apparatus differs from the apparatus illustrated in FIG. 19 in that the storing device 107 is omitted.

When this apparatus is employed, handwriting images taken by the microcomputer 105 through the lens system 103, CCD 104, and stress sensor 113 signals are taken as handwriting data. The taken handwriting data is instantaneously reproduced by the microcomputer 105 so as to obtain reproduced handwriting data. The reproduced handwriting data is transmitted by the transmitting device 106 to the receiving device 109. The transmitted handwriting data is sent from the receiving device 109 to the computer 110.

Figure 22:
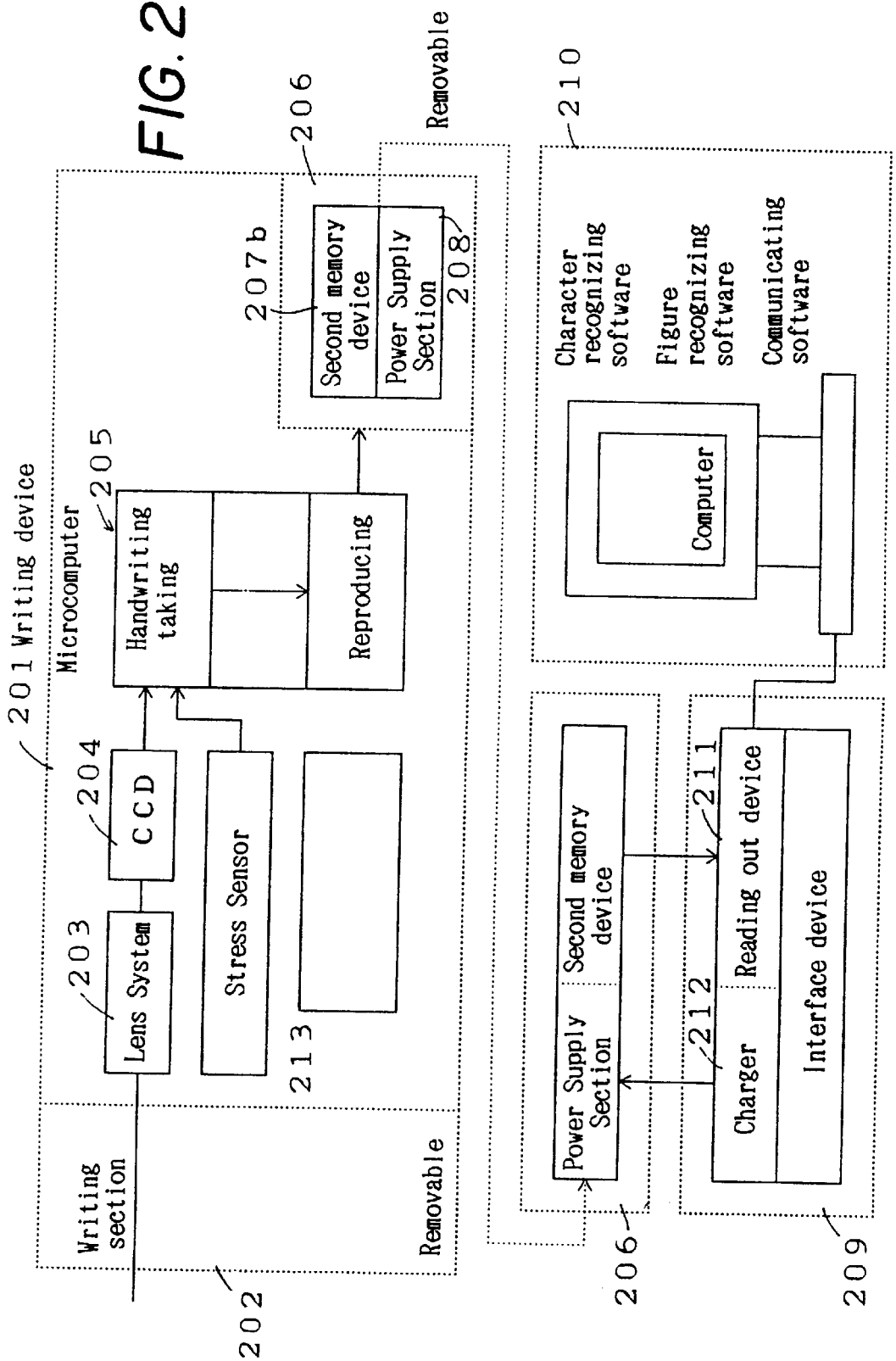

FIG. 22 is a block diagram illustrating an arrangement of a handwriting storing and reproducing apparatus which includes a writing device for storing handwriting of a fifth embodiment according to the present invention.

The apparatus differs from the apparatus illustrated in FIG. 20 in that the first storing device 207a is omitted.

When this apparatus is employed, handwriting images taken by the microcomputer 205 through the lens system 203, CCD 204, and stress sensor 213 signals are taken as handwriting data. The taken handwriting data is instantaneously reproduced by the microcomputer 205 so as to obtain reproduced handwriting data. The reproduced handwriting data is stored in the second storing device 207b. When the unit 206 is removed from the writing device 201 and is connected to the interface device 209, the stored reproduced handwriting data is read out by the computer 210 through the interface device 209.

Figure 23:
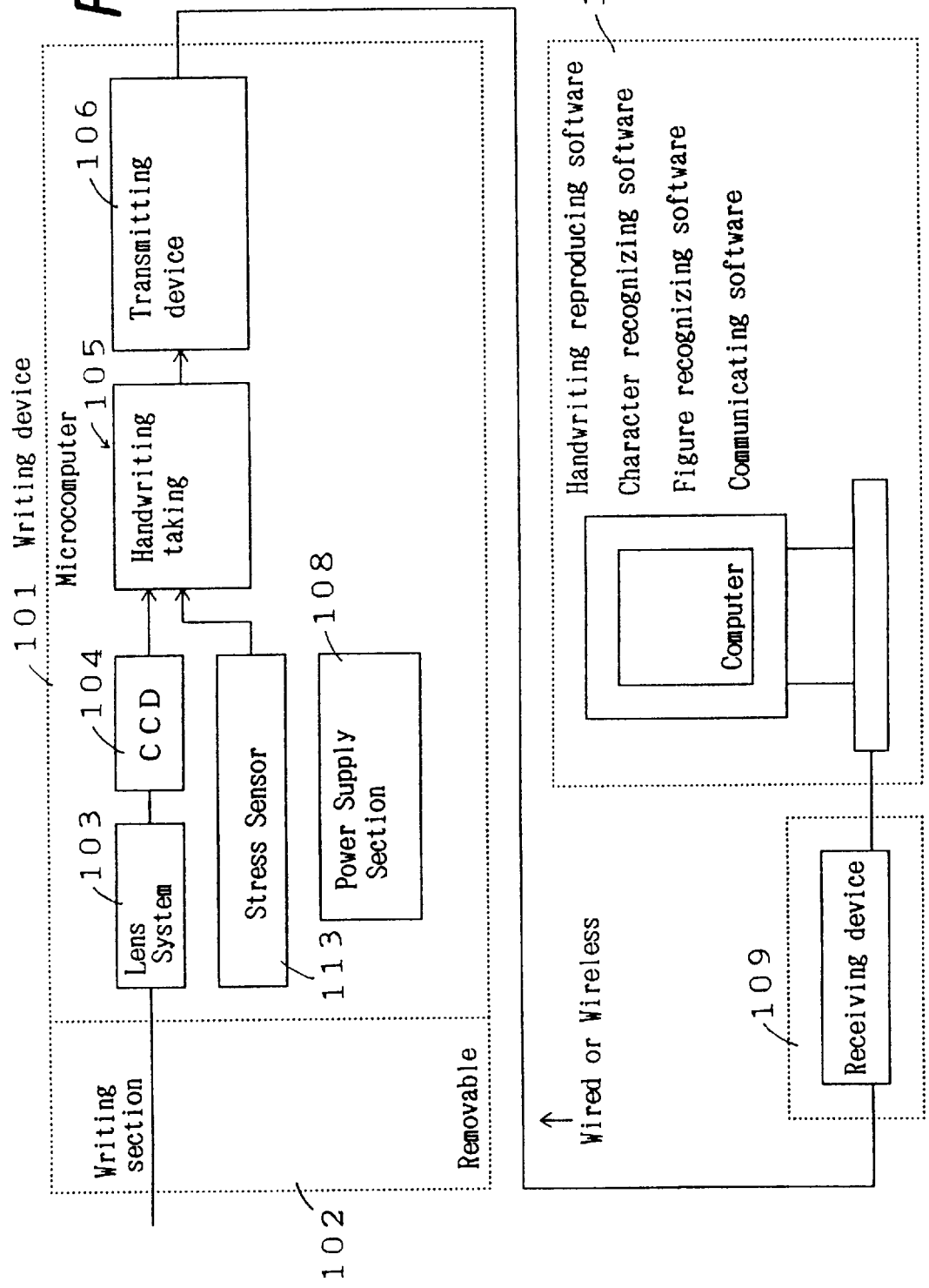

FIG. 23 is a block diagram illustrating an arrangement of a handwriting storing and reproducing apparatus which includes a writing device for storing handwriting of a sixth embodiment according to the present invention.

The apparatus differs from the apparatus illustrated in FIG. 21 in that the software for reproducing handwriting data representing an original handwriting based upon the stored handwriting data with the handwriting reproducing function within the microcomputer 105 is omitted and in that the software for reproducing handwriting data representing an original handwriting based upon the stored handwriting data with the handwriting reproducing function is included within the computer 110.

When this apparatus is employed, handwriting images taken by the microcomputer 105 through the lens system 103, CCD 104, and stress sensor 113 signals are taken as handwriting data. The taken handwriting data is instantaneously transmitted by the transmitting device 106 to the receiving device 109. The transmitted handwriting data is sent from the receiving device 109 to the computer 110.

Figure 24:
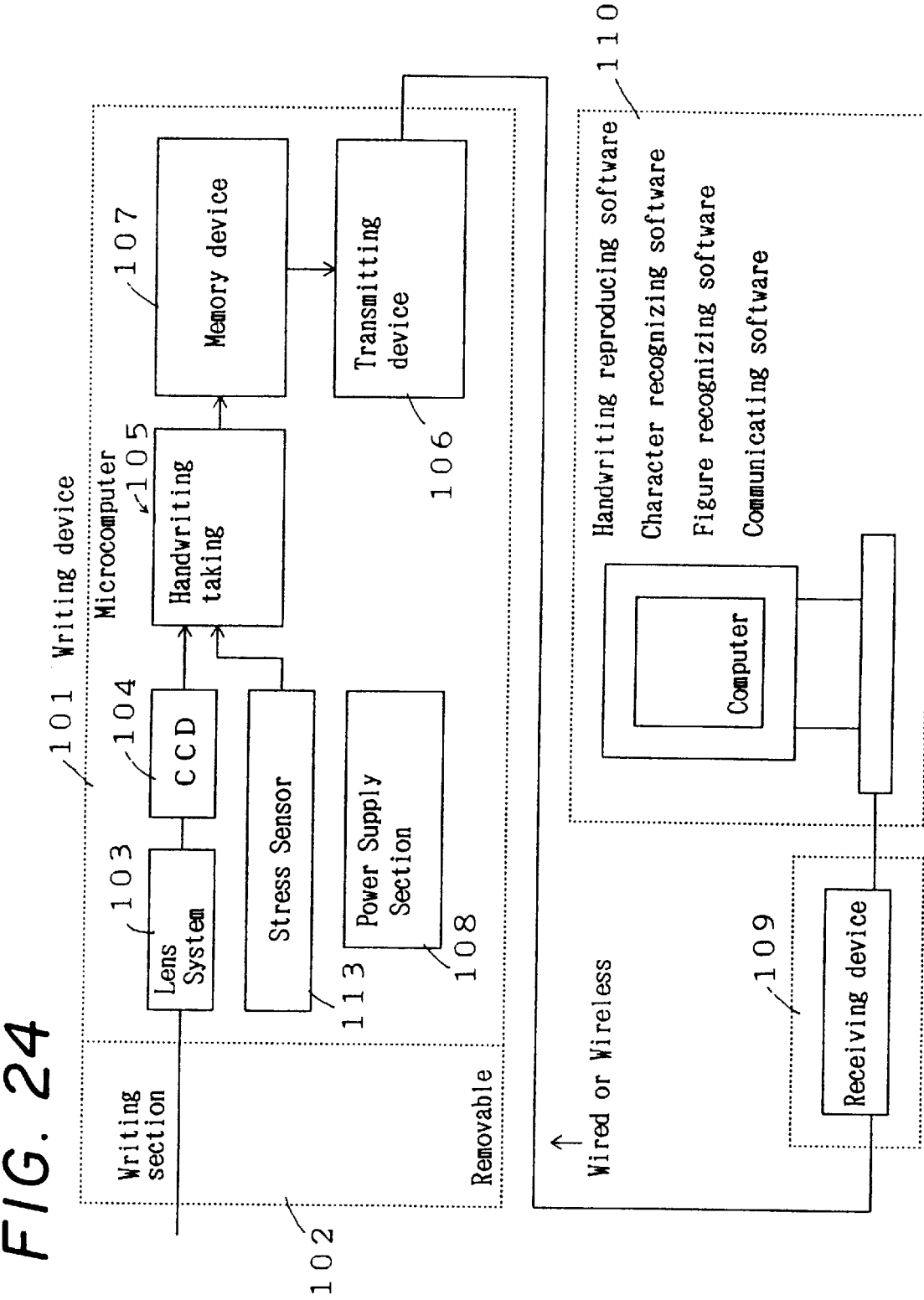

FIG. 24 is a block diagram illustrating an arrangement of a handwriting storing and reproducing apparatus which includes a writing device for storing handwriting of a seventh embodiment according to the present invention.

The apparatus differs from the apparatus illustrated in FIG. 19 in that the software for reproducing handwriting data representing an original handwriting based upon the stored handwriting data with the handwriting reproducing function within the microcomputer 105 is omitted and in that the software for reproducing handwriting data representing an original handwriting based upon the stored handwriting data with the handwriting reproducing function is included within the computer 110.

When this apparatus is employed, handwriting images taken by the microcomputer 105 through the lens system 103, CCD 104, and stress sensor 113 signals are taken as handwriting data. The taken handwriting data is stored by the storing device 107. The stored handwriting data is transmitted by the transmitting device 106 to the receiving device 109. The transmitted handwriting data is sent from the receiving device 109 to the computer 110. Though the taken handwriting data is stored by the storing device 107, handwriting data is gathered within the storing device 107 and is transmitted together within a short time period. Therefore, efficiency in handwriting data transmission is improved.

What is claimed is:

1. A writing device for storing handwriting, comprising:
   a writing section for writing handwriting on a writing medium,
   an image pickup means for picking up an image of a predetermined extent of the writing medium which extent includes a leading edge of the writing section and handwriting just written by the writing section,
   an image data taking means for taking image data picked up by the image pickup means at every predetermined sampling time,
   a storing means for sequentially storing the image data taken by the image data taking means at every predetermined sampling time,
   an image data outputting means for sequentially reading out the image data stored by the storing means and for outputting the read out image data,
   a power supply section for supplying power to the image pickup means, the image data taking means and the storing means, and
   a case body means for housing the image pickup means, the image data taking means, the storing means and the power supply section therein.

2. A writing device for storing handwriting as set forth in claim 1, wherein the storing means or the power supply section are housed within the case body means in a removable manner.

3. A writing device for storing handwriting as set forth in claim 1, further including a light receiving opening section for the image pickup means, the light receiving opening section being provided at an edge portion of the case body means which edge portion is at the same side of the case body means as the leading edge of the writing section.

4. A writing device for storing handwriting as set forth in claim 1, wherein the power supply section includes a chargeable battery or a solar battery.

5. A writing device for storing handwriting as set forth in claim 1, wherein
   the image pickup means includes an image pickup element, and
   the writing device for storing handwriting further includes a focusing means for adjusting a focus of an image formed on the image pickup element.

6. A writing device for storing handwriting as set forth in claim 5, wherein the focusing means includes ray radiating means for radiating rays from two or more different locations to the writing medium, each ray being directed in a predetermined direction.

7. A writing device for storing handwriting as set forth in claim 5, wherein the focusing means includes a measuring means for measuring a distance between a predetermined position of the case body means and a surface of the writing medium, and a adjusting means for automatically adjusting a focal length of the image pickup means in correspondence to the measured distance.

8. A writing device for storing handwriting as set forth in claim 7, wherein the measuring means includes a gauge means for gauging a distance between a predetermined position of the case body means and a surface of the writing medium to be a predetermined distance.

9. A writing device for storing handwriting as set forth in claim 1, wherein the image pickup means includes a lens which is exchangeable, said lens being one of a telephoto lens, a medium angle lens and a wide angle lens.

10. A writing device for storing handwriting as set forth in claim 1, wherein the writing section is a cartridge-type writing section and is exchangeable.

11. A writing device for storing handwriting as set forth in claim 1, wherein the case body means is removably attached to the writing section.

12. A writing device for storing handwriting as set forth in claim 1,
   further including a charging section, and
   wherein the storing means and the power supply section are united in one body, and the image data outputting means and the charging section are united in one body, and when the image data outputting means outputs image data stored by the storing means, the power supply section is charged by the charging section.

13. A writing device for storing handwriting, comprising:
   a writing section for writing handwriting on a writing medium,
   an image pickup means for picking up an image of a predetermined extent of the writing medium which extent includes a leading edge of the writing section and handwriting just written by the writing section,
   an image data taking means for taking image data picked up by the image pickup means at every predetermined sampling time,
   a storing means for sequentially storing the image data taken by the image data taking means at every predetermined sampling time,
   an image data transmitting means for sequentially transmitting the image data stored by the storing means to an external receiving apparatus,
   a power supply section for supplying power to the image pickup means, the image data taking means, the storing means, and the image data transmitting means, and
   a case body means for housing the image pickup means, the image data taking means, the storing means, the image data transmitting means and the power supply section therein.

14. A writing device for storing handwriting, comprising:
   a writing section for writing handwriting on a writing medium,
   an image pickup means for picking up an image of a predetermined extent of the writing medium which extent includes a leading edge of the writing section and handwriting just written by the writing section,
   an image data taking means for taking image data picked up by the image pickup means at every predetermined sampling time,
   an image data transmitting means for sequentially transmitting the taken image data to an external receiving apparatus,
   a power supply section for supplying power to the image pickup means, the image data taking means, and the image data transmitting means, and
   a case body means for housing the image pickup means, the image data taking means, the image data transmitting means and the power supply section therein.

15. A writing device for storing handwriting, comprising:
   a writing section for writing handwriting on a writing medium,
   an image pickup means for picking up an image of a predetermined extent of the writing medium which extent includes a leading edge of the writing section and handwriting just written by the writing section, an image data taking means for taking image data picked up by the image pickup means at every predetermined sampling time, a storing means for sequentially storing the image data taken by the image data taking means at every predetermined sampling time, an image outputting means for sequentially reading out the image data stored by the storing means and for outputting the read out image data, a handwriting reproducing means for reproducing handwriting written on the writing medium based upon the sequentially output image data, a transmitting means for sequentially transmitting the reproduced handwriting to an external receiving apparatus, a power supply section for supplying power to the image pickup means, the image data taking means, the storing means, the image data outputting means, the handwriting reproducing means, and the transmitting means, and a case body means for housing the image pickup means, the image data taking means, the storing means, the image data outputting means, the handwriting reproducing means, the transmitting means and the power supply section therein.

16. A writing device for storing handwriting as set forth in claim 15, further including a handwriting displaying section for displaying the handwriting which is reproduced based upon the image data taken by the image data taking means, the handwriting displaying section being positioned on the case body means.

17. A writing device for storing handwriting, comprising:

a writing section for writing handwriting on a writing medium, an image pickup means for picking up an image of a predetermined extent of the writing medium which extent includes a leading edge of the writing section and handwriting just written by the writing section, an image data taking means for taking image data picked up by the image pickup means at every predetermined sampling time, a first storing means for sequentially storing the image data taken by the image data taking means at every predetermined sampling time, an image outputting means for sequentially reading out the image data stored by the first storing means and for outputting the read out image data, a handwriting reproducing means for reproducing handwriting on the writing medium based upon the sequentially output image data, a second storing means for storing the reproduced handwriting, a power supply section for supplying power to the image pickup means, the image data taking means, the first storing means, the image data outputting means, the handwriting reproducing means, the second storing means, and a case body means for housing the image pickup means, the image data taking means, the first storing means, the image data outputting means, the handwriting reproducing means, the second storing means and the power supply section therein.

18. A writing device for storing handwriting, comprising:

a writing section for writing handwriting on a writing medium, an image pickup means for picking up an image of a predetermined extent of the writing medium which extent includes a leading edge of the writing section and handwriting just written by the writing section, an image data taking means for taking image data picked up by the image pickup means at every predetermined sampling time, a handwriting reproducing means for reproducing handwriting written on the writing medium based upon the sequentially taken image data, a transmitting means for transmitting the reproduced handwriting to an external receiving apparatus, a power supply section for supplying power to the image pickup means, the image data taking means, the handwriting reproducing means, and the transmitting means, and a case body means for housing the image pickup means, the image data taking means, the handwriting reproducing means, the transmitting means and the power supply section therein.

19. A writing device for storing handwriting, comprising:

a writing section for writing handwriting on a writing medium, an image pickup means for picking up an image of a predetermined extent of the writing medium which extent includes a leading edge of the writing section and handwriting just written by the writing section, an image data taking means for taking image data picked up by the image pickup means at every predetermined sampling time, a handwriting reproducing means for reproducing handwriting based upon the sequentially taken image data, a storing means for storing the reproduced handwriting a power supply section for supplying power to the image pickup means, the image data taking means, the handwriting reproducing means, and the storing means, and a case body means for housing the image pickup means, the image data taking means, the handwriting reproducing means, the storing means and the power supply section therein.

20. A writing device for storing handwriting, comprising:

a case body means, a writing section for writing handwriting on a writing medium, the writing section being housed within the case body means, an image pickup means for picking up an image of a predetermined extent of the writing medium which extent includes a leading edge of the writing section and handwriting just written by the writing section, the image pickup means including an electric image pickup element, a lens system, and a light receiving opening section for the lens system provided at a predetermined location of the case body means, an image data taking means for taking image data picked up by the image pickup means at every predetermined sampling time, a storing means for storing the taken image data, a power supply section for supplying power to the image pickup means, the image data taking means and the storing means, and an operation control means for controlling operation of the image pickup means.

21. A writing device for storing handwriting as set forth in claim 20, wherein the light receiving opening section is provided at an edge portion of the case body means which edge portion is opposite to the leading edge of the writing section.

22. A writing device for storing handwriting as set forth in claim 20, wherein the light receiving opening section is provided at an edge portion of the case body means which edge portion is at a same side of the case body means as the leading edge of the writing section.

23. A writing device for storing handwriting as set forth in claim 20, further including a marker-pointer for marking an expected image pickup extent of the writing medium by the image pickup means.

* * * * *